United States Patent
Ma et al.

(10) Patent No.: US 12,038,082 B1
(45) Date of Patent: Jul. 16, 2024

(54) CONTROL METHOD AND APPARATUS

(71) Applicant: Huawei Digital Power Technologies Co., Ltd., Shenzhen (CN)

(72) Inventors: Wenwu Ma, Xi'an (CN); Yi Cao, Shenzhen (CN); Maojie Ren, Xi'an (CN); Jinsong Zhang, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/339,394

(22) Filed: Jun. 22, 2023

Related U.S. Application Data

(63) Continuation of application No. PCT/CN2020/141597, filed on Dec. 30, 2020.

(51) Int. Cl.
F16H 57/04 (2010.01)
B60K 1/00 (2006.01)
F16H 57/02 (2012.01)

(52) U.S. Cl.
CPC ........... F16H 57/0476 (2013.01); B60K 1/00 (2013.01); F16H 57/0436 (2013.01); *F16H 2057/02034* (2013.01); *F16H 2057/02043* (2013.01); *F16H 57/0486* (2013.01)

(58) Field of Classification Search
CPC .... F01M 1/16; F01M 1/02; F01M 2001/0215; F01M 2001/0246; F01M 2250/64; F16H 57/0476; F16H 57/0436; F16H 57/0486; F16H 2057/02034; F16H 2057/02043; B60K 1/00
USPC .............................. 184/6.1, 6.22, 6.28, 6.12
See application file for complete search history.

(56) References Cited

U.S. PATENT DOCUMENTS

| | | | | |
|---|---|---|---|---|
| 4,199,950 A * | 4/1980 | Hakanson | ................ | F01M 5/00 123/196 CP |
| 5,597,051 A * | 1/1997 | Moriya | .................... | F01M 1/16 123/196 R |
| 5,884,601 A * | 3/1999 | Robinson | ................. | F01M 1/16 123/196 S |
| 6,561,155 B1 * | 5/2003 | Williams | ................. | F01M 1/02 123/196 AB |
| 9,151,193 B2 * | 10/2015 | Delaloye | ................ | F01M 5/025 |
| 9,618,154 B2 * | 4/2017 | Uusitalo | ................. | F16N 7/385 |
| 9,650,925 B2 * | 5/2017 | Free | ......................... | F01M 1/02 |
| 9,938,866 B2 * | 4/2018 | Borek | ...................... | F01M 1/16 |
| 11,174,764 B2 * | 11/2021 | Enström | .............. | F01M 13/028 |
| 11,231,103 B2 * | 1/2022 | Staake | ................ | F16H 57/0441 |
| 11,352,939 B2 * | 6/2022 | Oh | ......................... | F04B 49/065 |
| 11,441,653 B1 * | 9/2022 | Devreese | ................. | B60K 1/00 |

(Continued)

*Primary Examiner* — Henry Y Liu
(74) *Attorney, Agent, or Firm* — Maier & Maier, PLLC

(57) ABSTRACT

A control method and apparatus may be applied to an electric drive system. The electric drive system includes an oil pump, a motor, a reducer, and a housing, the motor and the reducer are disposed in the housing, lubricating oil is stored in the housing, and the oil pump is configured to pump the lubricating oil. The method includes: obtaining a first rotational speed of the motor, a second rotational speed of the oil pump, and a temperature of the lubricating oil in the housing; and controlling a rotational speed of the oil pump to be a third rotational speed based on the first rotational speed, the second rotational speed, and the temperature. In this way, the rotational speed of the oil pump can be adjusted to change liquid levels of the lubricating oil in a cavity and oil pump power at different rotational speeds of the oil pump.

15 Claims, 8 Drawing Sheets

(56) References Cited

U.S. PATENT DOCUMENTS

| | | | |
|---|---|---|---|
| 11,619,297 B2* | 4/2023 | Yu | F16H 57/0457 |
| | | | 184/6.12 |
| 2004/0129237 A1* | 7/2004 | Kato | F01M 1/16 |
| | | | 123/73 AD |
| 2004/0187835 A1* | 9/2004 | Hoff | F01M 5/025 |
| | | | 123/196 R |
| 2008/0121464 A1* | 5/2008 | Ledger | B60W 10/30 |
| | | | 184/6.13 |
| 2010/0018806 A1* | 1/2010 | Delaloye | F01M 5/025 |
| | | | 184/6.3 |
| 2011/0166727 A1 | 7/2011 | Light et al. | |
| 2012/0093672 A1* | 4/2012 | Stratulat | F04C 14/223 |
| | | | 418/31 |
| 2013/0074628 A1* | 3/2013 | Uusitalo | F16H 57/0435 |
| | | | 74/467 |
| 2013/0075198 A1* | 3/2013 | Uusitalo | F16H 57/0434 |
| | | | 184/6.12 |
| 2016/0221579 A1* | 8/2016 | Sasahara | B60W 10/06 |
| 2017/0356373 A1* | 12/2017 | Willard | F01M 1/02 |
| 2018/0038079 A1 | 2/2018 | Amano et al. | |
| 2019/0120369 A1* | 4/2019 | Staake | F16H 57/045 |
| 2020/0131954 A1 | 4/2020 | Ahn et al. | |
| 2020/0157983 A1* | 5/2020 | Hirai | F04B 49/065 |
| 2020/0343791 A1* | 10/2020 | Kitagawa | H02K 7/083 |
| 2021/0006132 A1* | 1/2021 | Steinz | F16H 57/0417 |
| 2021/0088124 A1* | 3/2021 | Remboski | H02K 9/19 |
| 2021/0404370 A1* | 12/2021 | Oh | F04B 49/065 |
| 2022/0042591 A1* | 2/2022 | Yu | F16H 57/045 |
| 2022/0149701 A1* | 5/2022 | Nakamatsu | H02K 5/22 |
| 2022/0173641 A1* | 6/2022 | Fujimoto | H02K 9/19 |
| 2023/0071735 A1* | 3/2023 | Smith | F02C 3/04 |
| 2023/0093220 A1* | 3/2023 | Vanhee | H02K 5/203 |
| 2023/0358247 A1* | 11/2023 | Yamarthi | F04D 29/706 |
| 2024/0039370 A1* | 2/2024 | Sakamoto | H02K 11/25 |

* cited by examiner

Obtain a first rotational speed of a motor, a second rotational speed of an oil pump, and a temperature of lubricating oil in a housing ~ S601

Control a rotational speed of the oil pump to be a third rotational speed based on the first rotational speed, the second rotational speed, and the temperature ~ S602

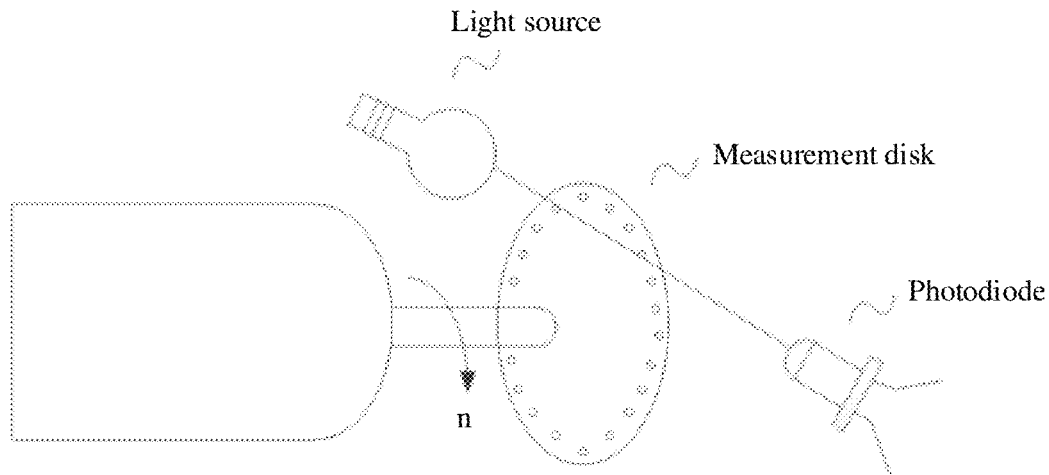

FIG. 7

Determine, based on a temperature, an association relationship corresponding to the temperature — S801

Determine, from the association relationship, a first loss corresponding to a first rotational speed and a second rotational speed — S802

Control a rotational speed of an oil pump to be a third rotational speed based on the first loss and the association relationship — S803

FIG. 8

Determine, from an association relationship, a plurality of second losses corresponding to a first rotational speed — S901

Adjust a rotational speed of an oil pump to a third rotational speed when one of the second losses is less than a first loss — S902

FIG. 9

CONTROL METHOD AND APPARATUS

CROSS-REFERENCE TO RELATED APPLICATIONS

This application is a continuation of International Application No. PCT/CN2020/141597, filed on Dec. 30, 2020, the disclosure of which is hereby incorporated by reference in its entirety.

TECHNICAL FIELD

The embodiments relate to the control field, a control method, and an apparatus.

BACKGROUND

An electric drive assembly is a core component of a new energy vehicle. Pursuit of high efficiency of the electric drive assembly has become a mainstream developmental requirement and trend. Efficiency improvement of the electric drive assembly system can improve an endurance mileage of the entire vehicle. The endurance mileage is one of the most important performance indicators of the new energy vehicle.

Currently, an electronic oil pump may be used to cool and actively lubricate a motor and a reducer. The electronic oil pump is used to pump lubricating oil to each friction part of the motor, so that the lubricating oil is circulated in a lubrication loop to ensure good cooling and lubrication of the motor.

However, when the electronic oil pump is used to cool and lubricate the motor and the reducer of the assembly, an assembly loss is relatively large, and assembly efficiency is not effectively improved.

SUMMARY

The embodiments may provide a control method and apparatus, to control a rotational speed of an oil pump to be a third rotational speed based on a first rotational speed of a motor, a second rotational speed of the oil pump, and a temperature of lubricating oil. In this way, a liquid level of the lubricating oil in a housing can be actively controlled by adjusting the rotational speed of the oil pump, to change liquid levels of the lubricating oil in the housing and oil pump power at different rotational speeds of the oil pump, so that assembly efficiency is effectively improved.

According to a first aspect, an embodiment may provide a control method, applied to an electric drive system. The electric drive system includes an oil pump, a motor, a reducer, and a housing, the motor and the reducer are disposed in the housing, lubricating oil is stored in the housing, and the oil pump is configured to pump the lubricating oil. The method includes: obtaining a first rotational speed of the motor, a second rotational speed of the oil pump, and a temperature of the lubricating oil in the housing; and controlling a rotational speed of the oil pump to be a third rotational speed based on the first rotational speed, the second rotational speed, and the temperature. In this way, in this embodiment, the rotational speed of the oil pump can be adjusted to change liquid levels of the lubricating oil in the housing and oil pump power at different rotational speeds of the oil pump, so that assembly efficiency is effectively improved.

In a possible implementation, the controlling a rotational speed of the oil pump to be a third rotational speed based on the first rotational speed, the second rotational speed, and the temperature includes: determining, based on the temperature, an association relationship corresponding to the temperature, where the association relationship includes an association relationship between a rotational speed of the motor, a rotational speed of the oil pump, and a loss; determining, from the association relationship, a first loss corresponding to the first rotational speed and the second rotational speed; and controlling the rotational speed of the oil pump to be the third rotational speed based on the first loss and the association relationship. Therefore, in this embodiment, the rotational speed of the oil pump may be controlled by using the association relationship between a rotational speed of the motor, a rotational speed of the oil pump, and a loss, so that the rotational speed of the oil pump can be controlled more accurately, thereby effectively improving assembly efficiency.

In a possible implementation, the controlling the rotational speed of the oil pump to be the third rotational speed based on the first loss and the association relationship includes: determining, from the association relationship, a plurality of second losses corresponding to the first rotational speed; and adjusting the rotational speed of the oil pump to the third rotational speed when one of the second losses is less than the first loss, where the third rotational speed is a rotational speed that is of the oil pump and that corresponds to the one of the second losses. In this embodiment, the rotational speed of the oil pump is adjusted to a rotational speed corresponding to a relatively small loss, so that assembly efficiency can be effectively improved.

In a possible implementation, the adjusting the rotational speed of the oil pump to the third rotational speed when one of the second losses is less than the first loss includes: adjusting the rotational speed of the oil pump to the third rotational speed when a plurality of second losses are less than the first loss, where the third rotational speed is a rotational speed that is of the oil pump and that corresponds to the lowest loss in the plurality of second losses. In this way, the rotational speed of the oil pump can be adjusted to minimize a loss, so that assembly efficiency is further effectively improved.

In a possible implementation, the loss includes an oil churning loss and oil pump power consumption, and the oil churning loss is a power loss caused by liquid resistance to which a gear of the reducer is subject when rotating in the lubricating oil in the housing.

In a possible implementation, a continuous function relationship exists between a rotational speed of the motor, a rotational speed of the oil pump, and a loss in the association relationship. In this way, the plurality of second losses corresponding to the first rotational speed can be determined more accurately, so that the rotational speed of the oil pump is adjusted to the rotational speed corresponding to the lowest loss, thereby further effectively improving assembly efficiency.

According to a second aspect, an embodiment may provide a control apparatus, applied to an electric drive system. The electric drive system includes an oil pump, a motor, a reducer, and a housing, the motor and the reducer are disposed in the housing, lubricating oil is stored in the housing, and the oil pump is configured to pump the lubricating oil.

The control apparatus may be a terminal device or may be a chip or a chip system in the terminal device. The control apparatus may include a processing unit. When the control apparatus is a terminal device, the processing unit may be a processor. The control apparatus may further include a storage unit, and the storage unit may be a memory. The storage unit is configured to store instructions, and the processing unit executes the instructions stored in the storage unit, so that the terminal device implements the control method described in any one of the first aspect and the possible implementations of the first aspect. When the control apparatus is a chip or a chip system in the terminal device, the processing unit may be a processor. The processing unit executes the instructions stored in the storage unit, so that the terminal device implements the control method described in any one of the first aspect and the possible implementations of the first aspect. The storage unit may be a storage unit (for example, a register or a cache) in the chip, or may be a storage unit (for example, a read-only memory or a random access memory) that is in the terminal device and that is located outside the chip.

For example, the processing unit is configured to obtain a first rotational speed of the motor, a second rotational speed of the oil pump, and a temperature of the lubricating oil in the housing. The processing unit is further configured to control a rotational speed of the oil pump to be a third rotational speed based on the first rotational speed, the second rotational speed, and the temperature.

In a possible implementation, the processing unit is further configured to determine, based on the temperature, an association relationship corresponding to the temperature. The association relationship includes an association relationship between a rotational speed of the motor, a rotational speed of the oil pump, and a loss. The processing unit is further configured to determine, from the association relationship, a first loss corresponding to the first rotational speed and the second rotational speed. The processing unit is further configured to control the rotational speed of the oil pump to be the third rotational speed based on the first loss and the association relationship.

In a possible implementation, the processing unit is further configured to: determine, from the association relationship, a plurality of second losses corresponding to the first rotational speed; and adjust the rotational speed of the oil pump to the third rotational speed when one of the second losses is less than the first loss. The third rotational speed is a rotational speed that is of the oil pump and that corresponds to the one of the second losses.

In a possible implementation, the processing unit is further configured to adjust the rotational speed of the oil pump to the third rotational speed when a plurality of second losses is less than the first loss. The third rotational speed is a rotational speed that is of the oil pump and that corresponds to the lowest loss in the plurality of second losses.

In a possible implementation, the loss includes an oil churning loss and oil pump power consumption, and the oil churning loss is a power loss caused by liquid resistance to which a gear of the reducer is subject when rotating in the lubricating oil in the housing.

In a possible implementation, a continuous function relationship exists between a rotational speed of the motor, a rotational speed of the oil pump, and a loss in the association relationship.

According to a third aspect, an embodiment may provide a control apparatus, including a processor, configured to invoke a program in a memory to implement the control method described in any one of the first aspect and the possible implementations of the first aspect.

According to a fourth aspect, the embodiments may further provide a power assembly, including the control apparatus in any one of the second aspect and the possible implementations of the second aspect. The power assembly further includes an inverter, a motor, and a reducer. The inverter is configured to: convert a direct current into an alternating current, and then transfer the alternating current to the motor; the motor is configured to convert the alternating current into mechanical energy to drive a vehicle; and the reducer is configured to convert an output rotational speed of a rotating shaft of the motor.

According to a fifth aspect, the embodiments may further provide a vehicle, including the power assembly in the fourth aspect and a power battery pack. The power battery pack is configured to provide a direct current for an inverter.

According to a sixth aspect, an embodiment may provide a chip, including a processor and an interface circuit. The interface circuit is configured to communicate with another apparatus, and the processor is configured to run a computer program or instructions, to perform the control method described in any one of the first aspect and the implementations of the first aspect.

The communications interface in the chip may be an input/output interface, a pin, a circuit, or the like.

In a possible implementation, the chip or the chip system may further include at least one memory, and the at least one memory stores the instructions. The memory may be a storage unit inside the chip, for example, a register or a cache, or may be a storage unit (for example, a read-only memory or a random access memory) of the chip.

According to a seventh aspect, an embodiment may provide a non-transitory computer-readable storage medium. The non-transitory computer-readable storage medium stores a computer program or instructions, and when the computer program or the instructions run on a computer, the computer performs the control method described in any one of the first aspect and the implementations of the first aspect.

It should be understood that the second aspect to the seventh aspect may correspond to the first aspect and beneficial effects achieved in the aspects and the corresponding implementations are similar and are not described again.

BRIEF DESCRIPTION OF THE DRAWINGS

FIG. 7 is a schematic diagram of obtaining a first rotational speed of a motor according to an embodiment;

FIG. 8 is a schematic flowchart of a control method according to an embodiment;

FIG. 9 is a schematic flowchart of a control method according to an embodiment;

DETAILED DESCRIPTION OF THE EMBODIMENTS

To clearly describe the embodiments, terms such as "first" and "second" are used in the embodiments to distinguish between same items or similar items that provide basically same functions and purposes. For example, a first rotational speed and a second rotational speed are merely used to distinguish between a rotational speed of an oil pump and a rotational speed of a motor, and a sequence thereof is not limited. A person skilled in the art may understand that the terms such as "first" and "second" do not limit a quantity and an execution sequence, and the terms such as "first" and "second" do not indicate a definite difference.

It should be noted that, a word such as "example" or "for example" is used to represent giving an example, an illustration, or a description. Any embodiment described as an "example" or "for example" should not be explained as being more preferred or having more advantages than another embodiment. Use of the word "example" or "for example" or the like is intended to present a relative concept.

"At least one" means one or more, and "a plurality of" means two or more. "And/or" describes an association relationship between associated objects and represents that three relationships may exist. For example, A and/or B may represent the following cases: only A exists, both A and B exist, and only B exists, where A and B may be singular or plural. The character "/" may indicate an "or" relationship between the associated objects. At least one of the following items (pieces) or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

An electric drive assembly system may include a motor controller, a motor, and a reducer. An efficiency loss of each part affects efficiency of the electric drive assembly system, and therefore affects an endurance mileage of an entire vehicle. An oil churning loss of a gear of the reducer is an important part of an efficiency loss of the electric drive assembly system.

When the motor runs at a high speed, a stator of the motor may generate a large amount of heat. If heat dissipation is not performed in a timely manner, working reliability of the motor and performance of the entire vehicle are severely affected. Therefore, heat dissipation needs to be performed on the motor.

Currently, common motor heat dissipation manners may include two manners: water-cooled heat dissipation and oil-cooled heat dissipation.

Figure 1:
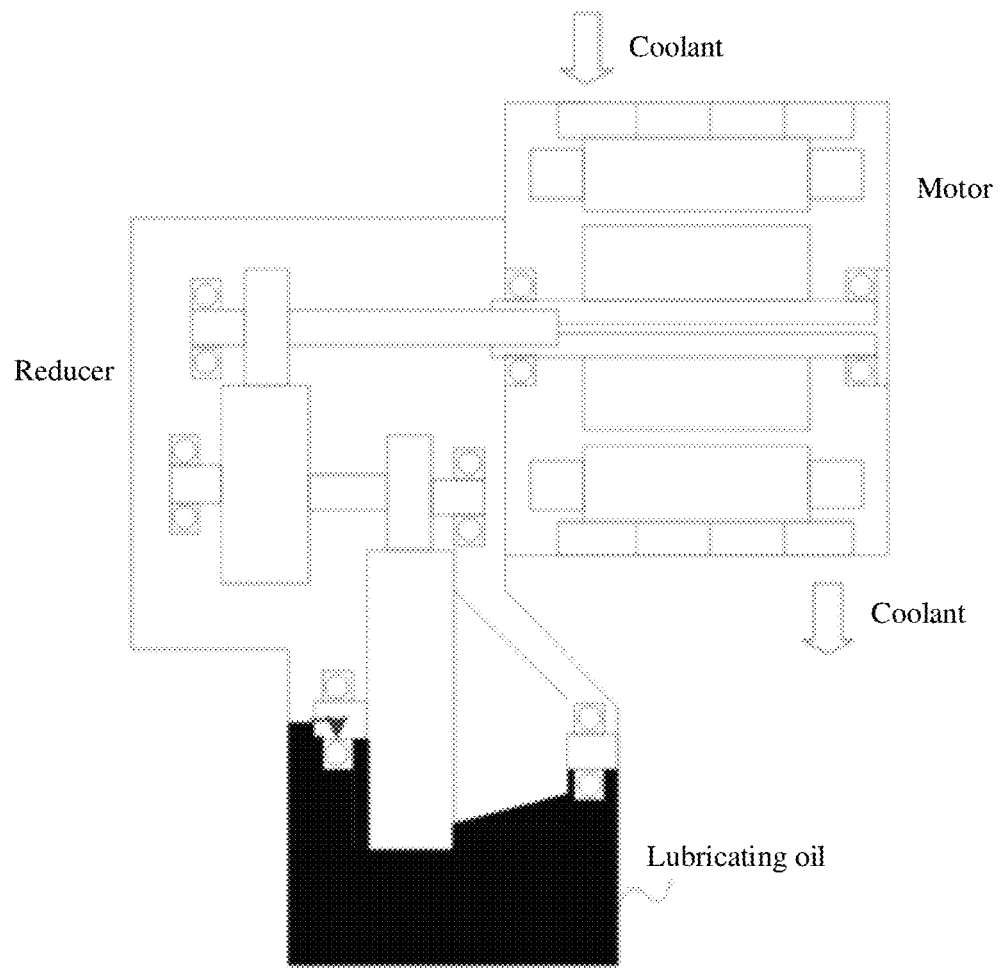
FIG. 1 is a schematic diagram of an electric drive assembly with a water-cooled motor according to an embodiment.

For example, FIG. 1 is a schematic diagram of an electric drive assembly with a water-cooled motor. As shown in FIG. 1, a stator of the motor performs heat dissipation by using a coolant (for example, antifreeze), and a reducer performs lubrication by using lubricating oil. For example, the coolant is driven by using a water pump to accelerate flowing, to perform heat dissipation on the motor.

Figure 2:
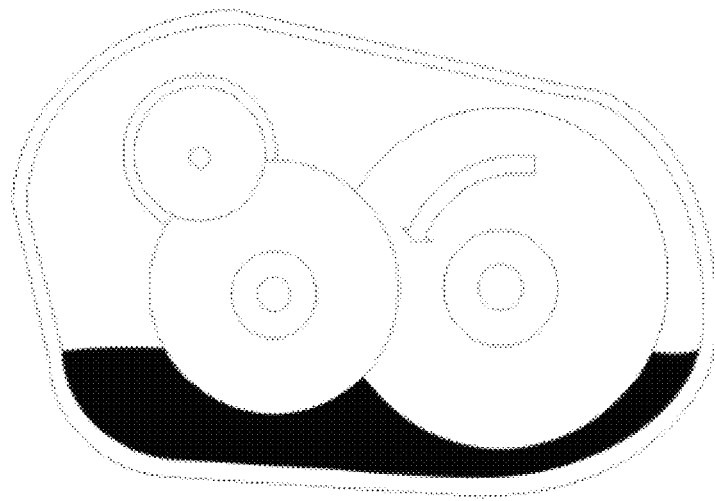
FIG. 2 is a schematic diagram of an oil churning status of a reducer when heat dissipation is performed through water cooling according to an embodiment.

The lubricating oil is located in a housing, and the reducer performs splashing lubrication on gears and bearings by using an output shaft gear by performing oil churning. For example, FIG. 2 is a schematic diagram of an oil churning status of the reducer when heat dissipation is performed through water cooling. The reducer includes components such as gears, shafts, and bearings. The gear of the reducer is partially immersed in an oil box, and the lubricating oil is brought to a meshing gear surface through rotation of the gear for lubrication. To prevent an excessive power loss during oil churning, a depth of the gear immersed in the oil box should not be excessively large. For example, the depth of the gear immersed in the oil box may be one fourth of a radius of the gear. A distance from the top of the main reducer big gear to the bottom of the housing may be greater than 5 mm, to avoid an increase in friction because sludge or sundries at the bottom of the oil box cover the meshing gear surface.

However, when heat dissipation is performed on the motor through water cooling, to implement good lubrication of the gear and the bearing, a relatively large amount of lubricating oil is required, and a liquid level is relatively high. Consequently, an oil churning loss generated by the gear of the reducer is relatively large, and a liquid level of the lubricating oil cannot be adjusted with a change of a working condition of the assembly. It may be understood that after an oil filling amount of lubricating oil is determined, the oil churning loss is also fixed, and optimization cannot be performed on the oil churning loss.

Figure 3:
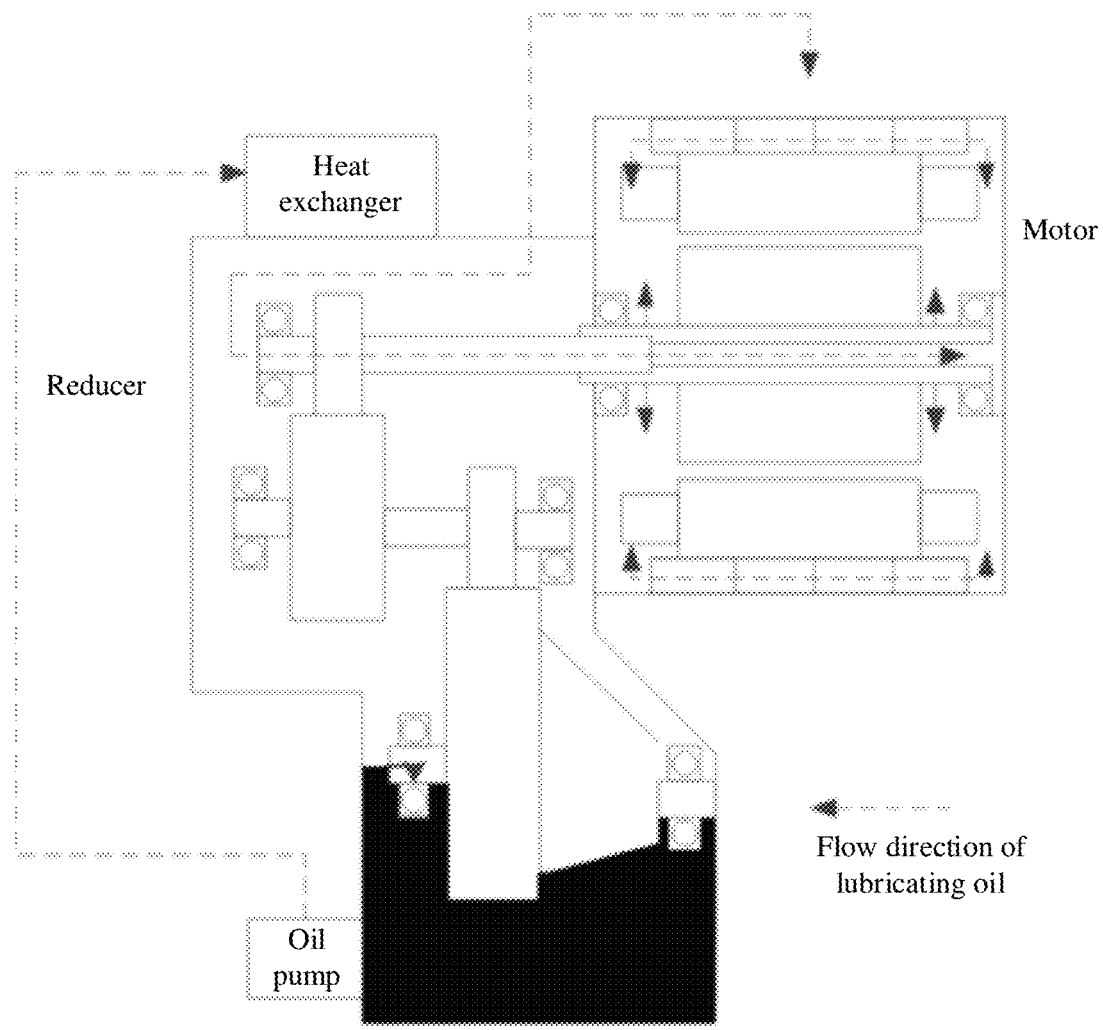
FIG. 3 is a schematic diagram of an electric drive assembly with an oil-cooled motor according to an embodiment.

For example, FIG. 3 is a schematic diagram of heat dissipation performed on a motor through oil cooling. As shown in FIG. 3, an electronic oil pump may be used to pump lubricating oil out of a housing, to implement cooling and active lubrication of the motor and a reducer.

When heat dissipation is performed on the motor through oil cooling because a lubricating oil circulation loop has an oil storage function, a liquid level of the reducer can be reduced, so that an oil churning loss can be reduced. However, when the oil pump is used to perform cooling and lubrication, only heat dissipation and lubrication of an assembly are considered, and the oil pump is not actively used to adjust a liquid level of the lubricating oil in a cavity to implement optimization of the oil churning loss. Therefore, the oil churning loss is not optimal in different working conditions of the assembly.

To resolve the problems in the foregoing two methods, the embodiments may provide a control method, to adjust a rotational speed of an oil pump to change liquid levels of lubricating oil in a cavity and oil pump power at different rotational speeds of the oil pump, so that assembly efficiency is effectively improved.

Figure 4:
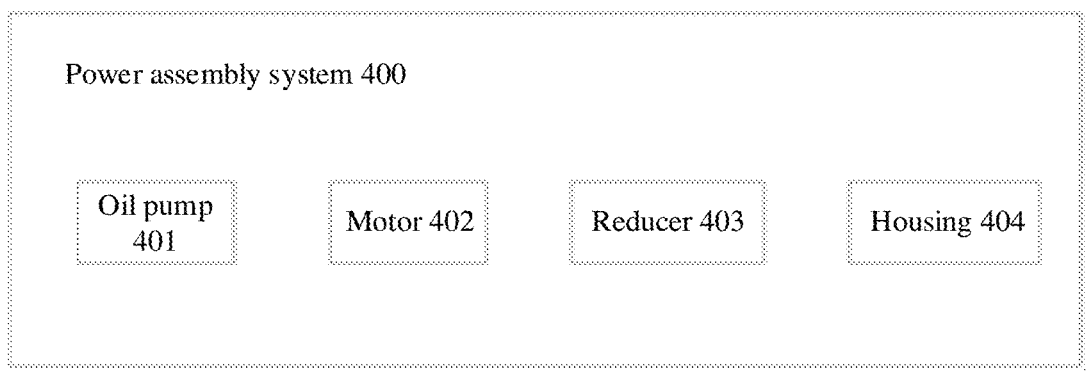
FIG. 4 is a schematic diagram of an electric drive assembly system according to an embodiment.

The control method provided in the embodiments may be applied to a power assembly system shown in FIG. 4. A power assembly system 400 may include an oil pump 401, a motor 402, a reducer 403, and a housing 404.

The motor 402 and the reducer 403 are disposed in the housing 404, lubricating oil is stored in the housing, and the oil pump 401 is configured to pump the lubricating oil to implement cooling and lubrication of the motor 402 and the reducer 403.

The motor 402 is an electromagnetic apparatus for implementing electric energy conversion or transfer according to the electromagnetic induction law, and is used to generate driving torque and generate power for an electric appliance or various machines. The motor 402 may be applied to an electric vehicle, for example, a pure electric vehicle, an extended range electric vehicle, a hybrid electric vehicle, a fuel cell vehicle, or a new energy vehicle.

Figures 5, 6:
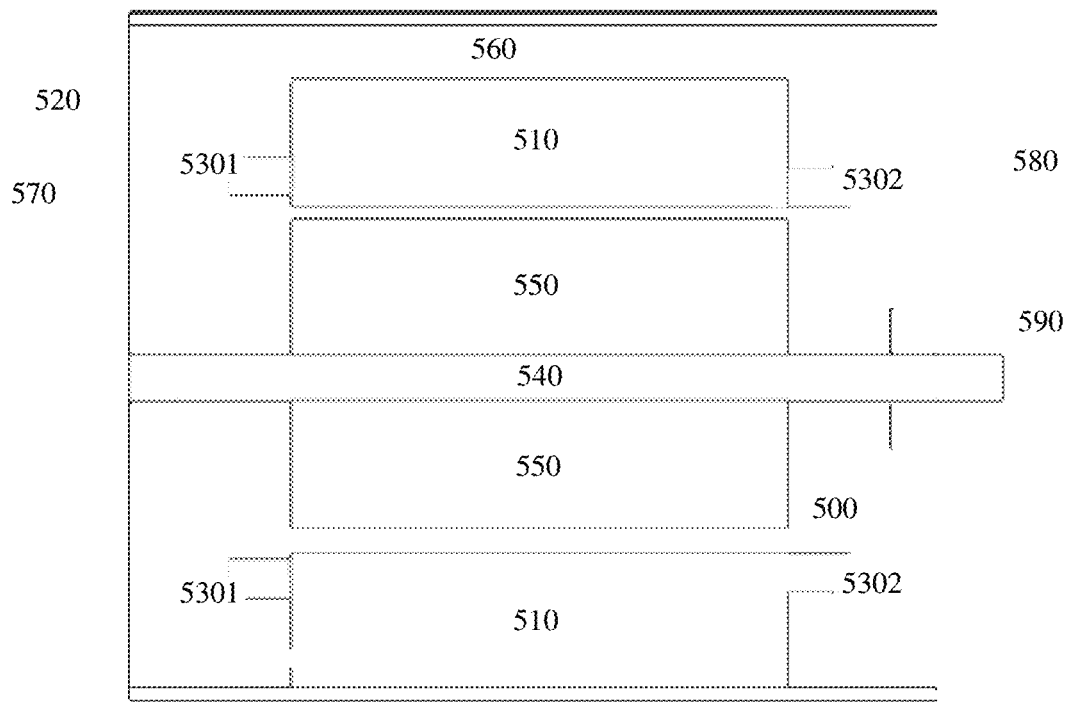
FIG. 5 is a schematic diagram of a basic internal structure of a motor according to an embodiment.
FIG. 6 is a schematic flowchart of a control method according to an embodiment.

FIG. 5 is a schematic diagram of an internal structure of a motor. As shown in FIG. 5, a motor 500 includes a stator 510, a rotating shaft 540, a rotor 550, a shell 560, a front end cover 570, a rear end cover 580, and motor bearings 590. A stator winding is disposed on the stator 510, and when the stator winding is disposed, two ends of the stator winding extend to the outside from two ends of a stator core to form an end 5301 and an end 5302 of the stator winding. A relationship between the components of the motor is as follows: A cavity is enclosed by inner walls of the shell 560, the front end cover 570, and the rear end cover 580, and the stator 510, the rotor 550, and the rotating shaft 540 are successively disposed in the cavity from the outside to the inside, in other words, the rotor 550 is sleeved onto the rotating shaft 540, and the stator 510 is sleeved onto the rotor 550. In addition, the stator 510 is fastened in the shell 560, and the rotor 550 drives the rotating shaft 540 to rotate. Two ends of the rotating shaft 540 are respectively rotatably connected to two side faces (the front end cover 570 and the rear end cover 580) of the shell 560 by using the motor bearings 590, and one of the two ends may also be connected to an input shaft gear of the reducer from one side face.

The reducer 403 includes a parallel axis gear transmission and a planetary gear reduction mechanism. An input gear of each parallel axis gear reduction mechanism is connected to one motor 402, an output gear is connected to a driving member of one planetary gear reduction mechanism, and a driven member of each planetary gear reduction mechanism is connected to one power output shaft. Because it is easier to process a gear in the parallel axis gear reduction mechanism at a same rotational speed, the parallel axis gear reduction mechanism is directly connected to the driving motor, and then the planetary gear reduction mechanism is connected to the parallel axis gear reduction mechanism, so that a rotational speed of the planetary gear reduction mechanism can be reduced, and a requirement on gear processing accuracy of the planetary gear reduction mechanism can be reduced.

The following several embodiments may be implemented independently or may be combined with each other. A same or similar concept or process is not described in some embodiments.

FIG. 6 is a schematic flowchart of a control method according to an embodiment. The method is applicable to the power assembly system corresponding to FIG. 4. As shown in FIG. 6, the control method provided in this embodiment may include the following steps.

S601: Obtain a first rotational speed of a motor, a second rotational speed of an oil pump, and a temperature of lubricating oil in a housing.

It may be understood that the first rotational speed of the motor is a rotational speed of a rotor of the motor.

In a possible implementation, the first rotational speed of the motor may be obtained by using a photoelectric sensor. The photoelectric sensor may include a projective photoelectric sensor or a reflective photoelectric sensor. For example, a schematic diagram of obtaining the first rotational speed of the motor by using the projection photoelectric sensor is shown in FIG. 7. A measurement disk such as a toothed disk or a hole disk is disposed on a motor shaft of a tested electric vehicle, and there are Z uniform tooth grooves or round holes on the disk. Z may be 60 or an integer multiple of 60. When a light beam passes through the groove or the small hole and is projected on a photodiode, an electronic signal is generated, and when a light beam is blocked by a part without a hole in the disk, the photodiode has no signal. Therefore, a frequency of a pulse signal generated by the photodiode is proportional to a rotational speed of the motor.

In a possible implementation, the temperature of the lubricating oil in the housing may be obtained by a temperature sensor.

It may be understood that the first rotational speed of the motor, the second rotational speed of the oil pump, and the temperature of the lubricating oil in the housing may be obtained in any possible manner. An obtaining manner is not limited in this embodiment.

S602: Control a rotational speed of the oil pump to be a third rotational speed based on the first rotational speed, the second rotational speed, and the temperature.

In a possible implementation, the first rotational speed, the second rotational speed, and the temperature may be input into a pre-trained model, and an obtained output result is the third rotational speed of the oil pump.

In a possible implementation, the first rotational speed, the second rotational speed, and the temperature may be input into a pre-obtained calculation formula, and the third rotational speed of the oil pump is obtained through calculation.

In a possible implementation, different rotational speeds of the oil pump and different rotational speeds of the motor at different oil temperatures are obtained through a plurality of tests, and tables corresponding to relationships between different rotational speeds of the oil pump and different rotational speeds of the motor at different oil temperatures are established. It is determined, by querying the tables, that the rotational speed of the oil pump is the third rotational speed.

In this embodiment, the rotational speed of the oil pump may be controlled to be the third rotational speed based on the first rotational speed, the second rotational speed, and the temperature in another possible manner with reference to an actual application scenario. This is not limited in this embodiment.

In this embodiment, a liquid level of the lubricating oil in the housing may be actively controlled by adjusting the rotational speed of the oil pump, to change liquid levels of the lubricating oil in a cavity and oil pump power at different rotational speeds of the oil pump, so that assembly efficiency is effectively improved.

Based on the embodiment corresponding to FIG. 1, in a possible implementation, as shown in FIG. 8, S602 includes the following steps.

S801: Determine, based on the temperature, an association relationship corresponding to the temperature, where the association relationship includes an association relationship between a rotational speed of the motor, a rotational speed of the oil pump, and a loss.

In a possible implementation, the loss may be an assembly loss. The assembly loss may include a motor loss, a bearing loss, an oil churning loss, and oil pump power consumption. The oil churning loss is related to a liquid level of the lubricating oil in the housing, and the oil pump power consumption is related to the rotational speed of the oil pump.

In a possible implementation, the loss may include one or more losses in the assembly loss.

In a possible implementation, the association relationship may be priori knowledge. The priori knowledge may be tables that are established by performing testing for relationships between different rotational speeds of the oil pump, different rotational speeds of the motor, and corresponding losses at different oil temperatures. The association relationship corresponding to the obtained temperature of the lubricating oil is obtained by querying the tables.

It may be understood that the association relationship in this embodiment may be alternatively a bar graph, a line graph, or another expression form. This is not limited in this embodiment.

S802: Determine, from the association relationship, a first loss corresponding to the first rotational speed and the second rotational speed.

It may be understood that the first loss may be an assembly loss corresponding to the first rotational speed and the second rotational speed, or the first loss may include one or more losses in the assembly loss.

In a possible implementation, the first loss corresponding to the first rotational speed and the second rotational speed may be determined by querying the tables.

For example, tables are established by performing separate testing for relationships between different rotational speeds of the oil pump, different rotational speeds of the motor, and corresponding losses at oil temperatures of 30° C., 40° ° C., 50° C., and 60° ° C. It may be understood that four tables may be obtained. When the obtained oil temperature is 30° C., the first loss that is in a table and that corresponds to the first rotational speed and the second rotational speed is determined by querying a relationship between different rotational speeds of the oil pump, different rotational speeds of the motor, and corresponding losses at the oil temperature of 30° C.

S803: Control the rotational speed of the oil pump to be the third rotational speed based on the first loss and the association relationship.

In a possible implementation, a plurality of loss values corresponding to the first rotational speed are determined, based on the first loss corresponding to the first rotational speed and the second rotational speed, from the association relationship corresponding to the obtained temperature of the lubricating oil, and it is determined whether a loss value less than the first loss exists in the plurality of loss values. When there are loss values less than the first loss, the third rotational speed is a rotational speed corresponding to one of the loss values less than the first loss. When there is no loss value less than the first loss, the rotational speed of the oil pump is controlled to be unchanged, which may mean that the third rotational speed is the same as the second rotational speed.

In a possible implementation, a plurality of loss values corresponding to the first rotational speed are determined, based on the first loss corresponding to the first rotational speed and the second rotational speed, from the association relationship corresponding to the obtained temperature of the lubricating oil. It is determined whether a loss value less than the first loss exists in the plurality of loss values. When there may be a plurality of loss values less than the first loss, the rotational speed of the oil pump is adjusted to a rotational speed corresponding to the lowest loss in the plurality of loss values less than the first loss. When there is no loss value less than the first loss, the rotational speed of the oil pump is controlled to be unchanged, which may mean that the third rotational speed is the same as the second rotational speed.

In this embodiment, the rotational speed of the oil pump may be controlled by using the association relationship between a rotational speed of the motor, a rotational speed of the oil pump, and a loss, so that the rotational speed of the oil pump can be adjusted more accurately, thereby effectively improving assembly efficiency.

Based on the embodiment corresponding to FIG. 8, in a possible implementation, the loss includes an oil churning loss and oil pump power consumption.

The churning oil loss is a power loss caused by liquid resistance to which a gear of a reducer is subject when rotating in the lubricating oil in the housing. The oil pump power consumption is related to the rotational speed of the oil pump. For example, a higher rotational speed of the oil pump indicates larger oil pump power consumption, and a lower rotational speed of the oil pump indicates smaller oil pump power consumption.

It may be understood that the oil churning loss is related to a liquid level of the lubricating oil in the housing, and the liquid level of the lubricating oil in the housing is related to the rotational speed of the oil pump. For example, in a case of a higher rotational speed of the oil pump, more lubricating oil is pumped, an amount of lubricating oil in the housing is smaller, and a liquid level is lower, causing a smaller power loss caused by liquid resistance to which the gear of the reducer is subject when rotating in the lubricating oil in the housing. Therefore, a corresponding oil churning loss is smaller. On the contrary, in a case of a lower rotational speed of the oil pump, less lubricating oil is pumped, and a liquid level of the lubricating oil in the housing is higher, causing a larger power loss caused by liquid resistance to which the gear of the reducer is subject when rotating in the lubricating oil in the housing. Therefore, a corresponding oil churning loss is larger.

In this embodiment, the rotational speed of the oil pump is adjusted based on the first rotational speed of the motor and the oil temperature of the lubricating oil, so that an amount of lubricating oil in cavities of the motor and the reducer can be changed, and an oil churning liquid level is adjusted, thereby controlling a sum of the oil churning loss and the oil pump power consumption to be a minimum. In this way, an assembly loss can be reduced, and assembly efficiency can be effectively improved.

Based on the embodiment corresponding to FIG. 8, in a possible implementation, as shown in FIG. 9, S803 includes the following steps.

S901: Determine, from the association relationship, a plurality of second losses corresponding to the first rotational speed.

In a possible implementation, the association relationship may be priori knowledge. The priori knowledge may be tables that are established by performing testing for relationships between different rotational speeds of the oil pump, different rotational speeds of the motor, and corresponding losses at different oil temperatures. The plurality of second losses corresponding to the first rotational speed are determined from the association relationship by querying the tables. The loss includes an oil churning loss and oil pump power consumption.

S902: Adjust the rotational speed of the oil pump to the third rotational speed when one of the second losses is less than the first loss.

The third rotational speed is a rotational speed that is of the oil pump and that corresponds to the one of the second losses.

For example, Table 1 is an established table about a relationship between different rotational speeds of the oil pump, different rotational speeds of the motor, and corresponding losses at an oil temperature of 40° C.

TABLE 1

| Rotational speed of the motor | Loss — Rotational speed of the oil pump | | | | |
|---|---|---|---|---|---|
| | 0 | 500 | 1000 | 1500 | 2000 |
| 10 | −0.041374019 | 1.966701571 | 3.280301613 | 4.352230343 | 6.061110057 |
| 100 | 14.88473822 | 19.10806283 | 19.75720568 | 21.43655737 | 23.62649258 |
| 200 | 24.91105675 | 117.8515183 | 100.1577143 | 116.3571159 | 28.18579267 |
| 300 | 137.4877539 | 134.9195812 | 136.7111623 | 129.3901122 | 149.8224251 |
| 400 | 254.7495079 | 242.16 | 242.3020135 | 213.3399312 | 262.8393466 |
| 500 | 392.3539529 | 380.8140314 | 382.338923 | 369.2485714 | 353.8125445 |
| 600 | 552.7764503 | 519.2280628 | 466.7275512 | 488.577819 | 496.4155476 |
| 700 | 678.4473665 | 678.7045026 | 572.205089 | 649.487819 | 587.8644607 |
| 800 | 849.3553927 | 817.118534 | 737.1896604 | 824.6381511 | 700.15166.49 |
| 900 | 1058.824084 | 909.819267 | 862.2907405 | 934.8646223 | 870.566689 |
| 1000 | 1236.912042 | 1041.950576 | 994.6978609 | 1017.412565 | 1047.741068 |

If the obtained temperature of the lubricating oil is 40° C., the first rotational speed is 300, and the second rotational speed is 500, it may be determined, by querying the table, that the first loss corresponding to the first rotational speed and the second rotational speed is 134.9195812, and the plurality of second losses corresponding to the first rotational speed are 137.4877539, 136.7111623, 129.3901122, and 149.8224251. Because the second loss 129.3901122 in the plurality of second losses is less than the first loss, the third rotational speed is a rotational speed 1500 that is of the oil pump and that corresponds to the second loss 129.3901122.

If the obtained temperature of the lubricating oil is 40° C., the first rotational speed is 300, and the second rotational speed is 1000, it may be determined, by querying the table, that the first loss corresponding to the first rotational speed and the second rotational speed is 136.7111623, and the plurality of second losses corresponding to the first rotational speed are 137.4877539, 134.9195812, 129.3901122, and 149.8224251. Because both the second losses 129.3901122 and 134.9195812 are less than the first loss, the third rotational speed is a rotational speed 1500 that is of the oil pump and that corresponds to the second loss 129.3901122, or the third rotational speed is a rotational speed 500 that is of the oil pump and that corresponds to the second loss 134.9195812.

In a possible implementation, when one of the second losses is less than the first loss and a rotational speed that is of the oil pump and that corresponds to the one of the second losses is not less than the second rotational speed, the rotational speed of the oil pump is adjusted to the rotational speed that is of the oil pump and that corresponds to the second loss. When the rotational speed that is of the oil pump and that corresponds to the second loss is less than the second rotational speed, the third rotational speed remains unchanged at the original second rotational speed.

It may be understood that in different working conditions, cooling and lubrication requirements of the assembly system can be ensured only when an amount of lubricating oil reaches a value. When the rotational speed of the oil pump is adjusted to a rotational speed less than the second rotational speed, an amount of oil pumped by the oil pump is reduced, which may lead to a problem that the cooling and lubrication requirements cannot be met. Therefore, to ensure the cooling and lubrication requirements of the assembly system, the third rotational speed may be adjusted to a rotational speed that is of the oil pump that corresponds to a second loss, and that is not less than the second rotational speed. In this way, assembly efficiency can be effectively improved while the cooling and lubrication requirements of the assembly system are met.

For example, as shown in Table 1, if the obtained temperature of the lubricating oil is 40° C., the first rotational speed is 400, and the second rotational speed is 500, it may be determined, by querying the table, that the first loss corresponding to the first rotational speed and the second rotational speed is 242.16, and the plurality of second losses corresponding to the first rotational speed are 254.7495079, 242.3020135, 213.3399312, and 262.8393466. Because the second loss 213.3399312 is less than the first loss, and a rotational speed 1500 that is of the oil pump and that corresponds to the second loss 213.3399312 is not less than the second rotational speed 500, the third rotational speed is a rotational speed 1500 that is of the oil pump and that corresponds to the second loss 213.3399312.

If the obtained temperature of the lubricating oil is 40° C., the first rotational speed is 100, and the second rotational speed is 500, it may be determined, by querying the table, that the first loss corresponding to the first rotational speed and the second rotational speed is 19.10806283, and the plurality of second losses corresponding to the first rotational speed are 14.88473822, 19.75720568, 21.43655737, and 23.62649258. Because the second loss 14.88473822 is less than the first loss, but a rotational speed 0 that is of the oil pump and that corresponds to the second loss 14.88473822 is less than the second rotational speed 500, the original second rotational speed of the oil pump remains unchanged.

In this embodiment, the plurality of second losses corresponding to the first rotational speed are determined from the association relationship, and when one of the second losses is less than the first loss, the rotational speed of the oil pump is adjusted to a rotational speed that is of the oil pump and that corresponds to the one of the second losses. In this way, the rotational speed of the oil pump can be adjusted to change liquid levels of the lubricating oil in a cavity and oil pump power at different rotational speeds of the oil pump, so that assembly efficiency is effectively improved.

Based on the embodiment in FIG. 9, in a possible implementation, S902 includes: when a plurality of second losses may be less than the first loss, adjusting the rotational speed of the oil pump to a rotational speed that is of the oil pump and that corresponds to the lowest loss in the plurality of second losses.

For example, Table 1 is an established table about a relationship between different rotational speeds of the oil pump, different rotational speeds of the motor, and corresponding losses at an oil temperature of 40° C.

If the obtained temperature of the lubricating oil is 40° C., the first rotational speed is 300, and the second rotational speed is 1000, it may be determined, by querying the table, that the first loss corresponding to the first rotational speed and the second rotational speed is 136.7111623, and the plurality of second losses corresponding to the first rotational speed are 137.4877539, 134.9195812, 129.3901122, and 149.8224251. Because both the second loss 129.3901122 and 134.9195812 are less than the first loss, the third rotational speed is a rotational speed 1500 that is of the oil pump and that corresponds to the lowest loss 129.3901122 in the plurality of second losses.

In a possible implementation, when a plurality of second losses are less than the first loss, and rotational speeds of the oil pump that correspond to the plurality of second losses are not less than the second rotational speed, the third rotational speed is a rotational speed that is of the oil pump and that corresponds to the lowest loss in the plurality of second losses.

For example, as shown in Table 1, if the obtained temperature of the lubricating oil is 40° C., the first rotational speed is 200, and the second rotational speed is 1000, it may be determined, by querying the table, that the first loss corresponding to the first rotational speed and the second rotational speed is 100.1577143, and the plurality of second losses corresponding to the first rotational speed are 24.91105675, 117.8515183, 116.3571159, and 28.18579267. Because the second losses 24.91105675 and 28.18579267 are less than the first loss, but a rotational speed 0 that is of the oil pump and that corresponds to the second loss 24.91105675 is less than the second rotational speed, and a rotational speed 28.18579267 that is of the oil pump and that corresponds to the second loss 24.91105675 is not less than the second rotational speed, the third rotational speed is the rotational speed 1500 that is of the oil pump and that corresponds to the second loss 28.18579267.

In this embodiment, when a plurality of second losses are less than the first loss, the rotational speed of the oil pump is adjusted to a rotational speed that is of the oil pump and that corresponds to the lowest loss in the plurality of second losses. In this way, the rotational speed of the oil pump can be adjusted to minimize a loss, so that assembly efficiency is further effectively improved.

Based on any one of the foregoing embodiments, in a possible implementation, a continuous function relationship exists between a rotational speed of the motor, a rotational speed of the oil pump, and a loss in the association relationship.

It may be understood that when the association relationship is established tables about relationships between different rotational speeds of the oil pump, different rotational speeds of the motor, and corresponding losses at different oil temperatures, the plurality of second losses corresponding to the first rotational speed cannot be accurately determined because test data is discrete data. For example, when the first rotational speed is 150, the plurality of second losses corresponding to the first rotational speed 150 cannot be directly determined from Table 1 because values are discrete and testing is not performed for a relationship between different rotational speeds and corresponding losses at the first rotational speed 150 in a test process.

Therefore, in a possible implementation, for example, on the basis of the discrete data in the established tables about the relationships between different rotational speeds of the oil pump, different rotational speeds of the motor, and corresponding losses at different oil temperatures, a continuous function may be obtained through interpolation based on the table with reference to an interpolation method, so that the continuous curve includes all discrete data points, and a continuous function relationship between a rotational speed of the motor, a rotational speed of the oil pump, and a loss is obtained.

In a possible implementation, different rotational speeds of the oil pump, different rotational speeds of the motor, and corresponding losses obtained through testing at different oil temperatures may be used as samples to train a neural network model, to obtain a continuous function relationship between a rotational speed of the motor, a rotational speed of the oil pump, and a loss.

After the first rotational speed of the motor, the second rotational speed of the oil pump, and the temperature of the lubricating oil in the housing are obtained, the plurality of second losses corresponding to the first rotational speed are determined by using a function relationship corresponding to the temperature, so that the rotational speed of the oil pump is controlled. A method for controlling the rotational speed of the oil pump may correspond to the descriptions in the foregoing embodiment, and details are not described herein again.

In this embodiment, a continuous function relationship exists between a rotational speed of the motor, a rotational speed of the oil pump, and a loss. In this way, the plurality of second losses corresponding to the first rotational speed can be determined more accurately, so that the rotational speed of the oil pump is adjusted to the rotational speed corresponding to the lowest loss, thereby further effectively improving assembly efficiency.

The foregoing describes the method in the embodiments with reference to FIG. 4 to FIG. 9. The following describes a control apparatus that is provided in the embodiments and that is used for performing the foregoing method. A person skilled in the art may understand that the method and the apparatus may be mutually combined and referenced. The control apparatus provided in the embodiments can perform steps of the control method.

An example in which each functional module is obtained through division based on each corresponding function is used below for description.

Figure 10:
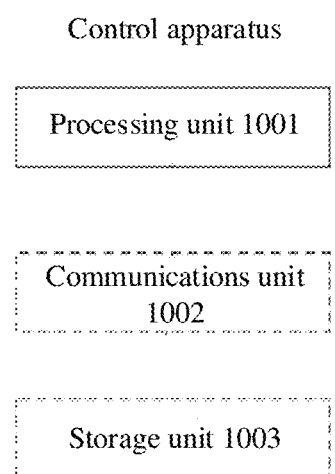
FIG. 10 is a schematic diagram of a structure of a control apparatus according to an embodiment.

FIG. 10 is a schematic diagram of a structure of a control apparatus according to an embodiment. The control apparatus includes a processing unit 1001. The processing unit 1001 is configured to complete a step of controlling a rotational speed of an oil pump.

For example, the control apparatus is a terminal device, or is a chip or a chip system applied to the terminal device. The processing unit 1001 is configured to support the control apparatus in performing S601 and S602, S801 to S803, S901 and S902, or the like in the foregoing embodiments.

In a possible embodiment, the control apparatus may further include a communications unit 1002 and a storage unit 1003. The processing unit 1001, the communications unit 1002, and the storage unit 1003 are connected by using a communications bus.

The storage unit 1003 may include one or more memories. The memory may be a component, in one or more devices or circuits, configured to store a program or data.

The storage unit 1003 may exist independently, and is connected, by using the communications bus, to the processing unit 1001 included in the control apparatus. The storage unit 1003 may be alternatively integrated with the processing unit.

The control apparatus may be used in a communications device, a circuit, a hardware component, or a chip.

For example, the control apparatus may be a terminal device in the embodiments. In this case, the communications unit 1002 may be an input or output interface, a pin, a circuit, or the like. For example, the storage unit 1003 may store computer executable instructions of a method of the terminal device, so that the processing unit 1001 performs the method of the terminal device in the foregoing embodiment. The storage unit 1003 may be a register, a cache, a RAM, or the like, and the storage unit 1003 may be integrated with the processing unit 1001. The storage unit 1003 may be a ROM or another type of static storage device that can store static information and instructions, and the storage unit 1003 may be independent of the processing unit 1001.

An embodiment may provide a control apparatus. The control apparatus includes one or more modules, configured to implement the methods in the steps included in FIG. 4 to FIG. 8, and the one or more modules may correspond to the steps of the methods in the steps included in FIG. 4 to FIG. 8. For the steps of the method performed by the terminal device in the embodiments, the terminal device includes a unit or a module for performing the steps of the method. For example, a module that controls a rotational speed of an oil pump may be referred to as a processing module. A module that performs a step of performing message or data processing on the control apparatus side may be referred to as a communications module.

Figure 11:
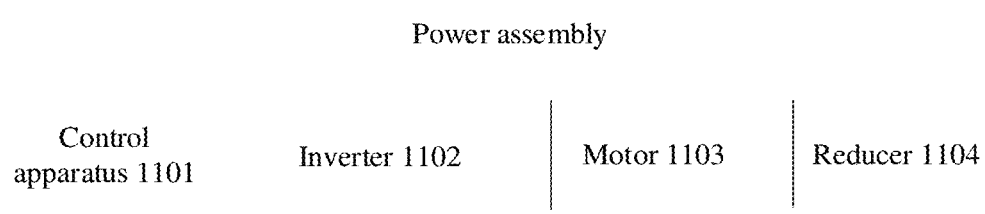
FIG. 11 is a schematic diagram of a structure of a power assembly according to an embodiment.

FIG. 11 is a schematic diagram of a structure of a power assembly according to an embodiment. As shown in FIG. 11, the power assembly includes a control apparatus 1101, an inverter 1102, a motor 1103, and a reducer 1104.

The control apparatus 1101 may correspond to the descriptions in FIG. 10, and details are not described in this embodiment.

The inverter 1102 is configured to: convert a direct current into an alternating current, and then transfer the alternating current to the motor 1103.

The motor 1103 is configured to convert the alternating current into mechanical energy to drive a vehicle.

The reducer 1104 is configured to convert an output rotational speed of a rotating shaft of the motor 1103.

Figure 12:
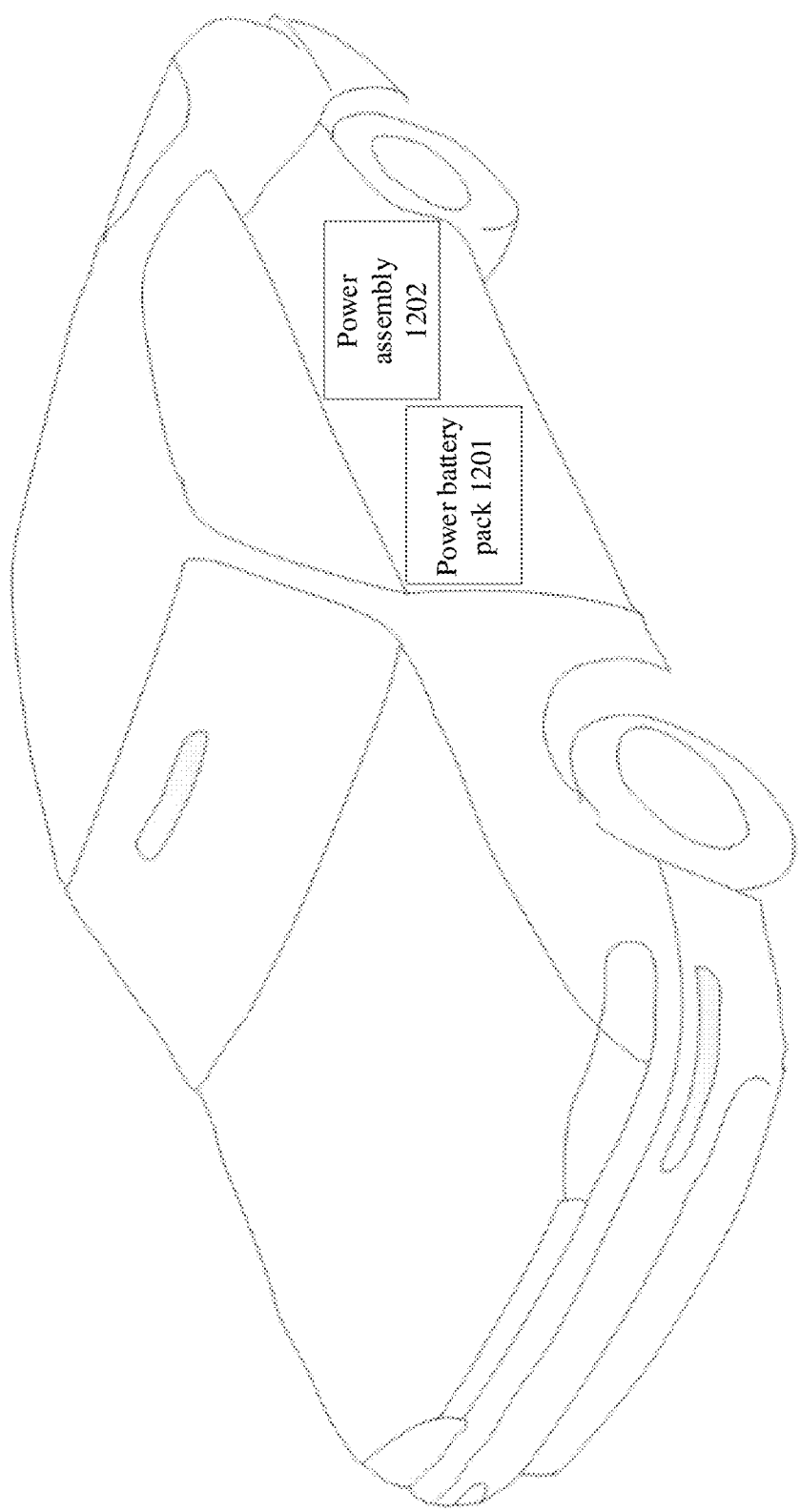
FIG. 12 is a schematic diagram of a structure of a vehicle according to an embodiment.

FIG. 12 is a schematic diagram of a structure of a vehicle according to an embodiment. As shown in FIG. 12, the vehicle includes a power battery pack 1201 and a power assembly 1202.

For the power assembly 1202, refer to the descriptions in FIG. 11. Details are not described in this embodiment.

The power battery pack 1201 is configured to provide a direct current for an inverter of the power assembly 1202.

Figure 13:
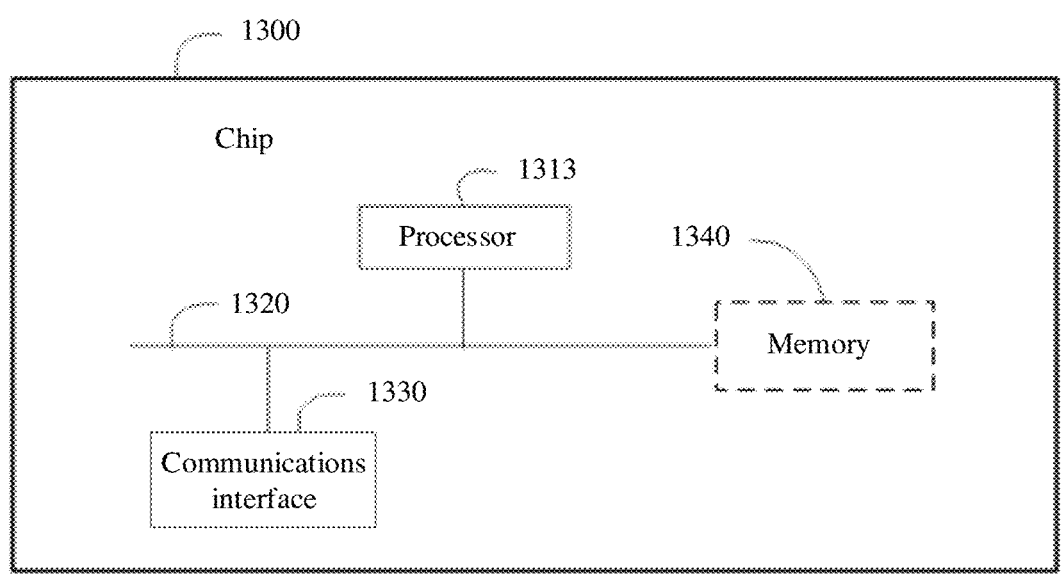
FIG. 13 is a schematic diagram of a structure of a chip according to an embodiment.

FIG. 13 is a schematic diagram of a structure of a chip 1300 according to an embodiment. The chip 130 includes one or more (including two) processors 1313 and a communications interface 1330.

In a possible embodiment, the chip 130 shown in FIG. 13 further includes a memory 1340. The memory 1340 may include a read-only memory and a random access memory and provides operation instructions and data for the processor 1313. A part of the memory 1340 may further include a non-volatile random access memory (NVRAM).

In some implementations, the memory 1340 stores the following elements, an executable module or a data structure, or a subset thereof, or an extended set thereof:

In this embodiment, a corresponding operation is performed by invoking the operation instructions stored in the memory 1340 (where the operation instructions may be stored in an operating system).

In a possible implementation, chip structures used by a terminal device, a radio access network apparatus, or a session management network element are similar. Different apparatuses may use different chips to implement respective functions.

The processor 1313 controls an operation of the terminal device, and the processor 1313 may be further referred to as a central processing unit (CPU). The memory 1340 may include a read-only memory and a random access memory and provides instructions and data for the processor 1313. A part of the memory 1340 may further include a non-volatile random access memory (NVRAM). For example, the processor 1313, the communications interface 1330, and the memory 1340 may be coupled together by using a bus system 1320. In addition to a data bus, the bus system 1320 may include a power bus, a control bus, a status signal bus, and the like. However, for clear description, various types of buses in FIG. 13 are marked as the bus system 1320.

The foregoing communications unit may be an interface circuit or a communications interface of the apparatus and is configured to receive a signal from another apparatus. For example, when the apparatus is implemented as a chip, the communications unit is an interface circuit or a communications interface that is of the chip and that is configured to receive a signal from another chip or apparatus or send a signal.

The foregoing method in the embodiments may be applied to the processor 1313 or implemented by the processor 1013. The processor 1310 may be an integrated circuit chip and has a signal processing capability. In the implementation process, each step of the foregoing method may be completed by using an integrated logical circuit of hardware in the processor 1310 or instructions in a form of software. The processor 1310 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are in the embodiments. The general-purpose processor may be a microprocessor, or the processor may be any conventional processor or the like. The steps in the methods with reference to the embodiments may be directly performed by a hardware decoding processor or may be performed by using a combination of hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 1340. The processor 1310 reads information in the memory 1340 and completes the steps of the foregoing methods in combination with hardware of the processor 1310.

In a possible implementation, the communications interface 1330 is configured to perform receiving and sending steps of the terminal device, the radio access network apparatus, or the session management network element in the embodiments shown in FIG. 4 to FIG. 9. The processor 1310 is configured to perform processing steps of the terminal device in the embodiments shown in FIG. 4 to FIG. 9.

In the foregoing embodiment, the instructions that are stored in the memory and that are to be executed by the processor may be implemented in a form of a computer program product. The computer program product may be written into the memory in advance or may be downloaded and installed in the memory in a form of software.

The computer program product includes one or more computer instructions. When the computer program instructions are loaded and executed on a computer, all or a part of the procedures or functions according to the embodiments are generated. The computer may be a general-purpose computer, a dedicated computer, a computer network, or another programmable apparatus. The computer instructions may be stored in a non-transitory computer-readable storage medium The non-transitory computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk solid state disk, SSD), or the like.

An embodiment may further provide a non-transitory computer-readable storage medium. All or a part of the methods described in the foregoing embodiments may be implemented by using software, hardware, firmware, or any combination thereof. If implemented in software, the function may be stored as one or more instructions or code on the non-transitory computer-readable medium The non-transitory computer-readable medium may include a RAM, a ROM, an EEPROM, a CD-ROM or another optical disc storage, a magnetic disk storage or another magnetic storage device, or any other medium that is used to carry or store required program code in a form of an instruction or a data structure and that is accessed by the computer. Magnetic disks and optical discs that may be used in the embodiments include a compact disk (CD), a laser disk, an optical disc, a digital versatile disc (DVD), a floppy disk, and a Blu-ray disc. The magnetic disks may magnetically reproduce data and the optical discs may optically reproduce data by using laser light. The combination described above should also be included in the scope of the non-transitory computer-readable medium. The foregoing descriptions are merely implementations, but are not intended to limit the scope of the embodiments. Any variation or replacement readily figured out by a person skilled in the art shall fall within the scope of the embodiments.

What is claimed is:

1. A control method, applied to an electric drive system, wherein the electric drive system comprises an oil pump, a motor, a reducer, and a housing, the motor and the reducer are disposed in the housing, lubricating oil is stored in the housing, the oil pump is configured to pump the lubricating oil, and the method comprises:
    obtaining a first rotational speed of the motor, a second rotational speed of the oil pump, and a temperature of the lubricating oil in the housing;
    controlling a rotational speed of the oil pump to be a third rotational speed based on the first rotational speed, the second rotational speed, and the temperature;
    wherein controlling the third rotational speed based on the first rotational, the second rotational speed, and the temperature further comprises:
    determining, based on the temperature, an association relationship corresponding to the temperature, wherein the association relationship comprises an association relationship between a rotational speed of the motor, a rotational speed of the oil pump, and a loss;
    determining, from the association relationship, a first loss corresponding to the first rotational speed and the second rotational speed; and
    controlling the rotational speed of the oil pump to be the third rotational speed based on the first loss and the association relationship.

2. The control method according to claim 1, wherein controlling the rotational speed of the oil pump to be the third rotational speed based on the first loss and the association relationship further comprises:
    determining, from the association relationship, a plurality of second losses corresponding to the first rotational speed; and
    adjusting the rotational speed of the oil pump to the third rotational speed when one of the second losses is less than the first loss, wherein the third rotational speed is a rotational speed that is of the oil pump and that corresponds to the one of the second losses.

3. The control method according to claim 2, wherein adjusting the rotational speed of the oil pump to the third rotational speed when one of the second losses is less than the first loss further comprises:
    adjusting the rotational speed of the oil pump to the third rotational speed when each loss of a plurality of second losses is less than the first loss, wherein the third rotational speed is a rotational speed that is of the oil pump and that corresponds to the lowest loss in the plurality of second losses.

4. The control method according to claim 1, wherein the loss comprises an oil churning loss and oil pump power consumption, and the oil churning loss is a power loss caused by liquid resistance to which a gear of the reducer is subject when rotating in the lubricating oil in the housing.

5. The control method according to claim 1, wherein a continuous function relationship exists between a rotational speed of the motor, a rotational speed of the oil pump, and a loss in the association relationship.

6. A control apparatus, applied to an electric drive system, wherein the electric drive system comprises an oil pump, a motor, a reducer, and a housing, the motor and the reducer are disposed in the housing, lubricating oil is stored in the housing, the oil pump is configured to pump the lubricating oil, and the apparatus comprises:
    a processing unit configured to:
        obtain a first rotational speed of the motor, a second rotational speed of the oil pump, and a temperature of the lubricating oil in the housing,
        control a rotational speed of the oil pump to be a third rotational speed based on the first rotational speed, the second rotational speed, and the temperature,
        determine, based on the temperature, an association relationship corresponding to the temperature, wherein the association relationship comprises an association relationship between a rotational speed of the motor, a rotational speed of the oil pump, and a loss;
        determine, from the association relationship, a first loss corresponding to the first rotational speed and the second rotational speed; and
        control the rotational speed of the oil pump to be the third rotational speed based on the first loss and the association relationship.

7. The control apparatus according to claim 6, wherein the processing unit is further configured to:
    determine, from the association relationship, a plurality of second losses corresponding to the first rotational speed; and
    adjust the rotational speed of the oil pump to the third rotational speed when one of the second losses is less than the first loss, wherein the third rotational speed is a rotational speed that is of the oil pump and that corresponds to the one of the second losses.

8. The control apparatus according to claim 7, wherein the processing unit is further configured to:
adjust the rotational speed of the oil pump to the third rotational speed when each loss of a plurality of second losses is less than the first loss, wherein the third rotational speed is a rotational speed that is of the oil pump and that corresponds to the lowest loss in the plurality of second losses.

9. The control apparatus according to claim 6, wherein the loss comprises an oil churning loss and oil pump power consumption, and the oil churning loss is a power loss caused by liquid resistance to which a gear of the reducer is subject when rotating in the lubricating oil in the housing.

10. The control apparatus according to claim 6, wherein a continuous function relationship exists between a rotational speed of the motor, a rotational speed of the oil pump, and a loss in the association relationship.

11. A power assembly, comprising a control apparatus, wherein the control apparatus is applied to an electric drive system, wherein the electric drive system comprises an oil pump, a motor, a reducer, and a housing, the motor and the reducer are disposed in the housing, lubricating oil is stored in the housing, the oil pump is configured to pump the lubricating oil, and the apparatus comprises:
a processing unit configured to:
obtain a first rotational speed of the motor, a second rotational speed of the oil pump, and a temperature of the lubricating oil in the housing, and
control a rotational speed of the oil pump to be a third rotational speed based on the first rotational speed, the second rotational speed, and the temperature, wherein the power assembly further comprises an inverter, a motor, and a reducer;
the inverter is configured to:
convert a direct current into an alternating current, and then transfer the alternating current to the motor;
the motor is configured to:
convert the alternating current into mechanical energy to drive a vehicle; and
the reducer is configured to:
convert an output rotational speed of a rotating shaft of the motor;
wherein the processing unit is further configured to:
determine, based on the temperature, an association relationship corresponding to the temperature, wherein the association relationship comprises an association relationship between a rotational speed of the motor, a rotational speed of the oil pump, and a loss;
determine, from the association relationship, a first loss corresponding to the first rotational speed and the second rotational speed; and
control the rotational speed of the oil pump to be the third rotational speed based on the first loss and the association relationship.

12. The power assembly according to claim 11, wherein the processing unit is further configured to:
determine, from the association relationship, a plurality of second losses corresponding to the first rotational speed; and
adjust the rotational speed of the oil pump to the third rotational speed when one of the second losses is less than the first loss, wherein the third rotational speed is a rotational speed that is of the oil pump and that corresponds to the one of the second losses.

13. The power assembly according to claim 12, wherein the processing unit is further configured to:
adjust the rotational speed of the oil pump to the third rotational speed when each loss of a plurality of second losses is less than the first loss, wherein the third rotational speed is a rotational speed that is of the oil pump and that corresponds to the lowest loss in the plurality of second losses.

14. The power assembly according to claim 11, wherein the loss comprises an oil churning loss and oil pump power consumption, and the oil churning loss is a power loss caused by liquid resistance to which a gear of the reducer is subject when rotating in the lubricating oil in the housing.

15. The power assembly according to claim 11, wherein a continuous function relationship exists between a rotational speed of the motor, a rotational speed of the oil pump, and a loss in the association relationship.

* * * * *